United States Patent [19]

Thorogood et al.

[11] Patent Number: 4,871,382

[45] Date of Patent: Oct. 3, 1989

[54] AIR SEPARATION PROCESS USING PACKED COLUMNS FOR OXYGEN AND ARGON RECOVERY

[75] Inventors: Robert M. Thorogood, Macungie; Douglas L. Bennett, Allentown, both of Pa.; Rodney J. Allam, Westacre; Alan L. Prentice, Surbiton, both of United Kingdom; Bruce K. Dawson, Bethlehem, Pa.

[73] Assignee: Air Products and Chemicals, Inc., Allentown, Pa.

[21] Appl. No.: 187,682

[22] Filed: Apr. 29, 1988

Related U.S. Application Data

[63] Continuation-in-part of Ser. No. 132,535, Dec. 14, 1987, Pat. No. 4,783,210.

[51] Int. Cl.⁴ .............................................. F25J 3/00
[52] U.S. Cl. .......................................... 62/18; 55/74; 62/22; 62/24; 62/36
[58] Field of Search .................. 62/9, 11, 17, 20, 22, 62/23, 31, 34, 36, 38, 39, 18, 24, 42; 55/74

[56] References Cited

U.S. PATENT DOCUMENTS

| 3,729,943 | 5/1973 | Petit | 62/22 |
| 4,128,684 | 12/1978 | Bomio et al. | 428/175 |
| 4,186,159 | 1/1980 | Huber | 261/112 |
| 4,296,050 | 10/1981 | Meier | 261/112 |
| 4,455,339 | 6/1984 | Meier | 428/175 |
| 4,497,751 | 2/1985 | Pluss | 261/94 |
| 4,497,752 | 2/1985 | Huber | 261/95 |
| 4,497,753 | 2/1985 | Streiff | 261/95 |
| 4,533,375 | 8/1985 | Erickson | 62/22 |
| 4,578,095 | 3/1986 | Erickson | 62/22 |
| 4,604,116 | 8/1986 | Erickson | 62/13 |
| 4,605,427 | 8/1986 | Erickson | 62/22 |
| 4,670,031 | 6/1987 | Erickson | 62/22 |
| 4,715,874 | 12/1987 | Erickson | 62/22 |

Primary Examiner—Ronald C. Capossela
Attorney, Agent, or Firm—Willard Jones, II; James C. Simmons; William F. Marsh

[57] ABSTRACT

The present invention relates to an improvement to a cryogenic air separation process having an argon sidearm column. The improvement to the process for maximizing argon recovery comprises effectuating the intimate contact of the liquid phase stream and the vapor phase stream in the low pressure column and the argon sidearm column of an integrated multi-column, e.g. three column, cryogenic distillation system by utilizing a structured or ordered packing.

3 Claims, 6 Drawing Sheets

AIR SEPARATION PROCESS USING PACKED COLUMNS FOR OXYGEN AND ARGON RECOVERY

The present application is continuation-in-part of U.S. Ser. No. 132,535 filed Dec. 14, 1987, now U.S. Pat. No. 4,783,210, the specification of is hereby incorporated by reference.

TECHNICAL FIELD

The present invention relates to a process for the separation of air into its constituent components. More specifically, the present invention relates to an air separation process which utilizes a structured packing as internals in the low pressure and argon sidearm columns of an integrated mutli-column distillation system.

BACKGROUND OF THE INVENTION

Numerous processes are known for the separation of air by cryogenic distillation into its constituent components, representative among these are U.S. Pat. Nos. 3,729,943; 4,533,375; 4,578,095; 4,604,116; 4,605,427; 4,670,031 and 4,715,874.

In addition, examples of structured or ordered packings are known in the art, representative among these are U.S. Pat. Nos. 4,128,684; 4,186,159; 4,296,050; 4,455,339; 4,497,751; 4,497,752 and 4,497,753.

SUMMARY OF THE INVENTION

The present invention relates to an improvement to a process for the separation of mixtures, which comprise oxygen, nitrogen, and argon, (e.g. air) by cryogenic distillation in an integrated multi-column distillation system having a low pressure column and an argon sidearm column, wherein the argon sidearm column integrally communicates with the low pressure column. A typical integrated multi-column distillation system has three columns. In each of these columns, a liquid phase stream and a vapor phase stream are intimately contacted thereby allowing mass transfer. The improvement comprises effectuating this intimate contact of the liquid and vapor phase streams in the low pressure column and the argon sidearm column with the use of structured packing.

DETAILED DESCRIPTION OF THE INVENTION

The present invention relates to an improvement to a process and apparatus for the separation of mixtures comprising oxygen, nitrogen and argon, e.g. air, by cryogenic distillation. For example, the cryogenic separation of air to produce nitrogen, oxygen and argon products is usually carried out in an integrated multi-column distillation system. A typical integrated multi-column distillation system has three columns, however, it may contain more. These three columns in the three column distillation system are called the high pressure column, the low pressure column and the argon sidearm column. Essentially, the improvement of the present invention is the use of a structured packing in place of distillation trays in the low pressure and argon sidearm columns of a three column distillation system. This use results in increased argon recovery.

The present invention is applicable to any air separation process producing argon and oxygen products. Examples of such air separation processes which separate argon and oxygen and produce both as products are shown in U.S. Pat. Nos. 3,729,943; 4,533,375; 4,578,095; 4,604,116; 4,605,427 and 4,670,031, the specifications of which are incorporated herein by reference.

Figure 1:
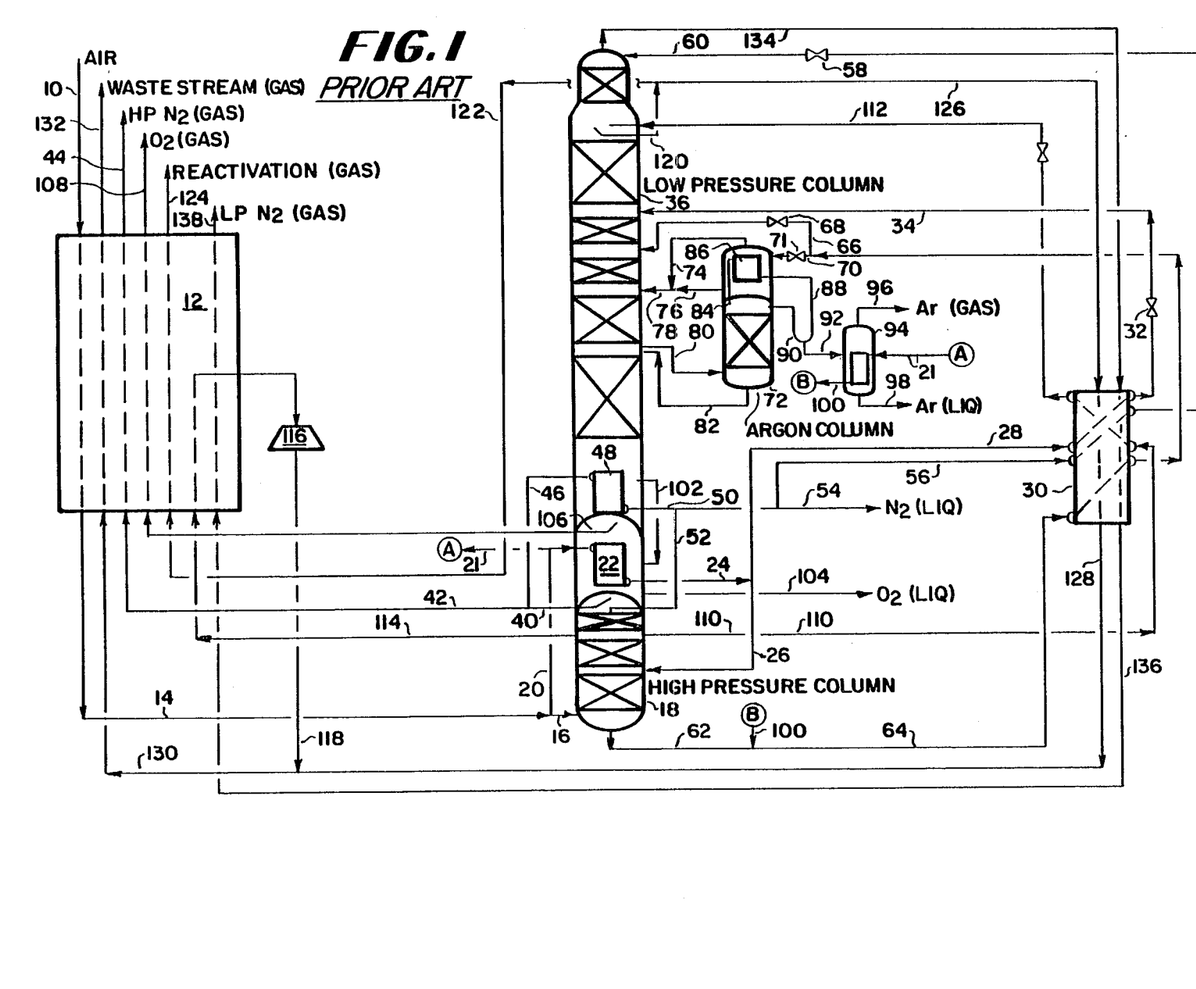
FIG. 1 and 2 are schematic diagrams of typical integrated distillation system separation processes producing argon and oxygen products.

The present invention is best understood in terms of a typical three column air separation process; a flow sheet for a typical three column air separation process producing oxygen and argon products is illustrated in FIG. 1.

With refernce to FIG. 1, compressed air at near ambient temperature is fed via line 10 to heat exchanger 12 wherein it is cooled to be close to its dew point. Water and carbon dioxide are removed from this feed air by mole sieve adsorption (not shown). This removal can also be accomplished by alternating the flow of air and a low pressure returning stream in heat exchanger 12, i.e. a reversing heat exchanger. This cooled, compressed, impurity-free air, now in line 14, is then split into two portions. The first portion is fed via line 16 to a lower location in high pressure column 18. The second portion, in line 20, is further split into two portions. The first portion is fed to argon product vaporizer 94 via line 21 and the second portion is fed to and condensed in product vaporizer 22 to provide boiling of liquid oxygen in the sump surrounding product vaporizer 22, and removed from product vaporizer 22 via line 24. The condensed liquid, in line 24, is then separated into two portions, the first portion which is fed as feed to an intermediate location of high pressure column 18 via line 26 and the second portion, in line 28, which is subcooled in heat exchanger 30 flashed in J-T valve 32 and fed into an intermediate location of low pressure column 36 via line 34.

Overhead is removed from high pressure column 18 via line 40 and then divided into two portions. The first portion is warmed in main heat exchanger 12 to recover refrigeration and then removed as high pressure nitrogen product via line 44. The second portion is fed via line 46 to reboiler/condenser 48 located in the bottom of low pressure column 36 wherein it is condensed and removed via line 50. This condensed pure nitrogen stream is then split into three portions. The first portion is fed via line 52 to the top of high pressure column 18 to provide reflux. The second portion is removed as liquid nitrogen product via line 54, and the third portion, removed via line 56, is subcooled in heat exchanger 30, flashed in J-T valve 58 and fed to the top of low pressure column 36 via line 60, to provide a pure nitrogen reflux to the top hat portion of low pressure column 36. As an option, the second portion in line 54 can be subcooled in subcooler 30 before being removed as product.

Oxygen-inriched liquid bottoms from high pressure column 18 is removed via line 62. This stream is combined with stream 100, a condensed air stream from argon product vaporizer 94, to form combined oxygen-enriched liquid stream 64. This combined liquid stream is subcooled in heat exchanger 30 and then split into two substreams. The first substream, line 66, is flashed in J-T valve 68 and fed into an upper-intermediate location of low pressure column 36. The second substream, line 70, is flashed in J-T valve 71 and fed to the sump surrounding condenser 86 located at the top of argon column 72 to provide refrigeration for condenser 86. A gaseous overhead is removed from the overhead potion of the sump surrounding condenser 86 via line 74 and is combined with a small liquid stream 76 also removed from the sump surrounding condenser 86 to form combined stream 78. Stream 76 is withdrawn for safety reasons; this withdrawal prevents the accumulation of hydrocarbons in the sump surrounding condenser 86. This combined stream 78 is then fed into an intermediate location of low pressure column 36.

A side stream is removed from a lower-intermediate location of low pressure column 36 via line 80 and fed to a lower portion of argon column 72. The bottoms liquid from argon column 72 is returned via line 82 to low pressure column 36 at the same location as the side stream 80 draw in order to provide intermediate column reflux. Overhead argon is removed from argon column 72 via line 84, condensed in condenser 86 and split into two portions. The first portion is returned to the top of argon column 72 via line 90 to provide reflux to argon column 72. The second portion is removed and fed via line 92 to argon product vaporizer 94. Argon gas product is removed from product vaporizer 94 via line 96 and argon liquid product is removed from product vaporizer 94 via line 98.

A bottoms liquid stream is removed from low pressure column 36 (the bottom sump surrounding reboiler/condenser 48) and fed to the sump surrounding product vaporizer 22 via line 102. Gaseous oxygen product is removed from the overhead of the sump surrounding product vaporizer 22 via line 106, warmed to recover refrigeration in main heat exchanger 12 and removed as gaseous oxygen product via line 108. A liquid oxygen product is removed from a lower portion of the sump surrounding product vaporizer 22 as liquid oxygen product via line 104.

A liquid side stream is removed via line 110 from an intermediate location of high pressure column 18. This impure liquid side stream is subcooled in heat exchanger 30, reduced in pressure and fed as reflux to an upper portion of low pressure column 36 via line 112. In addition, a gaseous side stream is removed via line 114 from a similar location of high pressure column 18. This side stream is warmed in main heat exchanger 12 to recover refrigeration and work expanded in expander 116 to recover refrigeration. This expanded stream is now in stream 118.

A gaseous side stream is removed via line 120 from an upper location of low pressure column 36 and split into two portions. The first portion, in line 122, is warmed in heat exchanger 12 to recover refrigeration, used as reactivation gas and removed from the process via line 124. Reactivation gas is necessary to reactivate a mole sieve adsorption unit which is used to remove water and carbon dioxide from compressed feed air. If reactivation gas is unnecessary, then stream 124 would be vented to the atmosphere as waste. The second portion of the side stream line 126, is warmed in heat exchanger 30 to recover refrigeration and combined with expanded stream 118 to form combined stream 130. This combined stream 130 is then warmed in heat exchanger 12 to recover refrigeration and vented as waste via line 132.

Finally, an overhead from low pressure column 36 is removed via line 134 and warmed in heat exchanger 30 to recover refrigeration. This warmed overhead, now in line 136, is further warmed in heat exchanger 12 to recover refrigeration and removed as low pressure nitrogen product via line 138.

Figure 2:
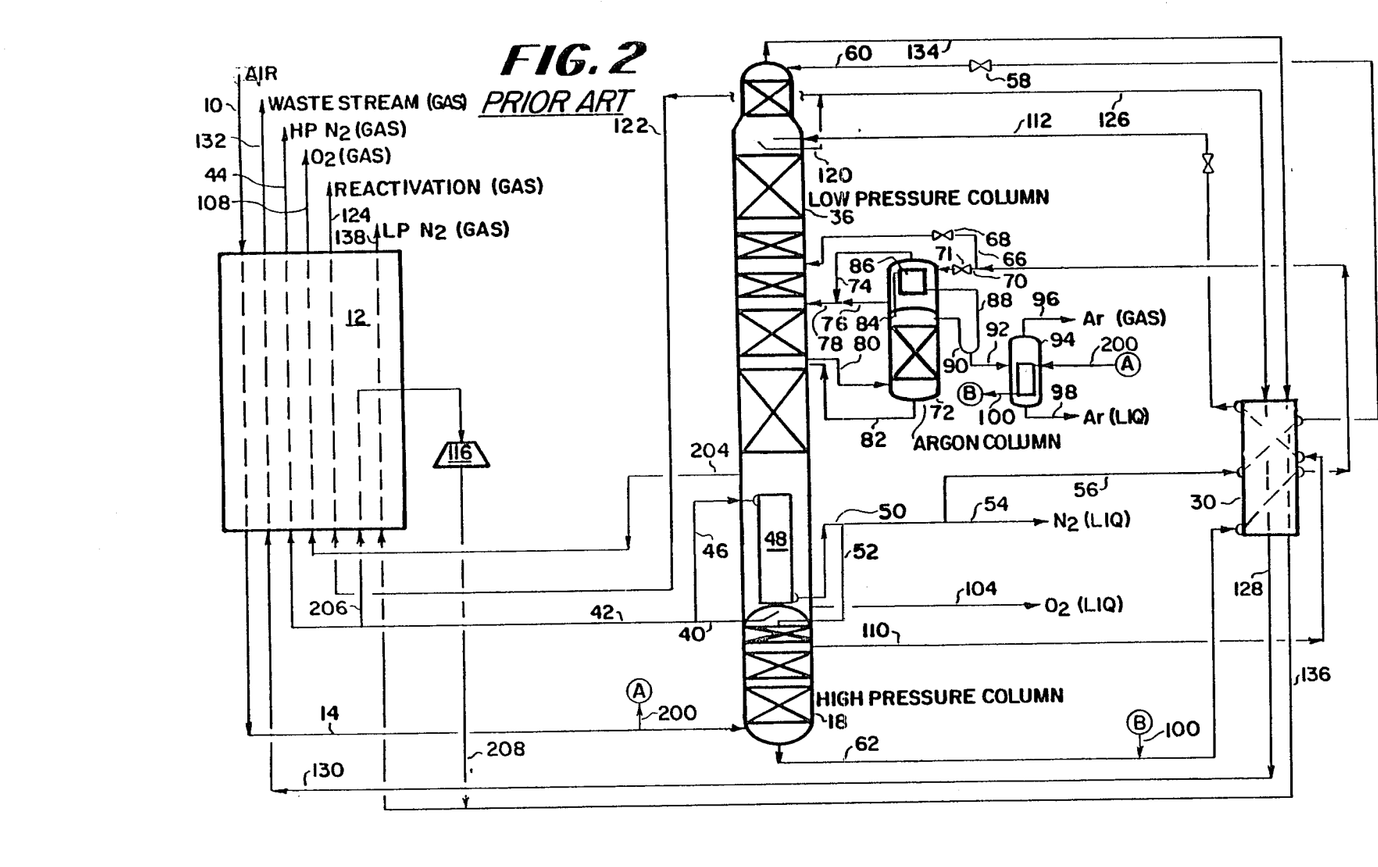

An alternative embodiment of the three column process is shown in FIG. 2. FIG. 2 shows a three column process where oxygen is vaporized as product directly from the low pressure column without the use of an air condensation vaporizer. Common streams in FIGS. 1 and 2 have the same number.

With reference to FIG. 2, compressed air at near ambient temperature is fed via line 10 to heat exchanger 12 wherein it is cooled to be close to its dew point. Water and carbon dioxide are removed from this feed air by more sieve adsorption (not shown). This removal can also be accomplished by alternating the flow of air and a low pressure returning stream in heat exchanger 12, i.e. a reversing heat exchanger. This cooled, compressed, impurity-free air now in line 14 is then split into two portions. The first portion is fed via line 16 to a lower location of high pressure column 18. The second portion is fed via line 200 to argon product vaporizer 22 from which the condensed stream is returned via line 100 to join with line 62.

Overhead is removed from high pressure column 18 via line 40 and then divided into two portions. The first portion, line 42, is divided into two substream. The first substream is warmed in main heat exchanger 12 to recover refrigeration and then removed as high pressure nitrogen product via line 44. The second substream, line 206, is warmed in heat exchanger 12, expanded in expander 116 to recover refrigeration and united via line 208 with the low pressure nitrogen in line 136. The second portion is fed via line 46 to reboiler/condenser 48 located in the bottom of low pressure column 36 wherein it is condensed and removed via line 50. This condensed pure nitrogen stream is then split into three portions. The first portion is fed via line 52 to the top of high pressure column 18 to provide reflux to high pressure column 18. The second portion is removed as liquid nitrogen product via line 54, and the third portion, removed via line 56, is subcooled in heat exchanger 30, flashed an J-T valve 58 and fed to the top of low pressure column 36 via line 60, to provide a pure nitrogen reflux to the top hat portion of low pressure column 36. As an option, the second portion in line 54 can be subcooled in subcooler 30 before being removed as product.

Oxygen-enriched liquid bottoms from high pressure column 18 is removed via line 62 and is subscooled in heat exchanger 30. This liquid stream is then split into two substreams. The first substream, line 66, is flashed in J-T valve 68 and fed into an upper-intermediate location of low pressure column 36. The second substream, line 70, is flashed in J-T valve 71 and fed to the sump surrounding condenser 86 located at the top of argon column 72 to provide refrigeration for condenser 86. A gaseous overhead is removed from the overhead portion of the sump surrounding condenser 86 via line 74 and is combined with a small liquid stream 76 also removed from the sump surrounding condenser 86 to form combined stream 78. Stream 76 is withdrawn for safety reasons; this withdrawal prevents the accumulation of hydrocarbons in the sump surrounding condenser 86. This combined stream 78 is then fed into an intermediate location of low pressure column 36.

A side stream is removed from a lower-intermediate location of low pressure column 36 via line 80 and fed to a lower portion of argon column 72. The bottoms liquid from argon column 72 is returned via line 82 to low pressure column 36 at the same location as the side stream 80 draw in order to provide intermediate column reflux. Overhead argon is removed from argon column 72 via line 84, condensed in condenser 86 and split into two portions. The first portion is returned to the top of argon column 72 via line 90 to provide reflux to argon column 72. The second portion is removed and fed via line 92 to argon product vaporizer 94. Argon gas product is removed from product vaporizer 94 via line 96 and argon liquid product is removed from product vaporizer 94 via line 98.

A bottoms gaseous oxygen stream is removed from low pressure column 36 above the bottom sump surrounding reboiler/condenser 48, via line 204, warmed to recover refrigeration in main heat exchanger 12 and removed as gaseous oxygen product via line 108. A liquid oxygen product is removed from a lower portion of the sump surrounding reboiler-condenser 48 as liquid oxygen product via line 104.

A liquid side stream is removed via line 110 from an intermediate location of high pressure column 18. This impure liquid side stream is subcooled in heat exchanger 30, reduced in pressure and fed as reflux to an upper portion of low pressure column 36 via line 112.

A gaseous side stream is removed via line 120 from an upper location of low pressure column 36 and split into two portions. The first portion, in line 122, is warmed in heat exchanger 12 to recover refrigeration, used as reactivation gas and removed from the process via line 124. Reactivation gas is necessary to reactivate a mole sieve adsorption unit which is used to remove water and carbon dioxide from compressed feed air. If reactivation gas is unnecessary, then stream 124 would be vented to the atmosphere as waste. The second portion of the side stream, line 126, is warmed in heat exchangers 30 and 12 to recover refrigeration and vented as waste via line 132.

Finally, an overhead from low pressure column 36 is removed via line 134 and warmed in heat exchanger 30 to recover refrigeration. This warmed overhead, now in line 136, is united with low pressure nitrogen in line 208 and further warmed in heat exchanger 12 to recover refrigeration and removed as low pressure nitrogen product via line 138.

Conventionally, the distillation columns in the above processes would utilize columns with distillation trays. Although dependent upon the selected cycle, product makes, and relative values of power and capital, the typical theoretical tray counts for the high pressure column, low pressure column and argon column are; 50, 70 and 40, respectively. In order to increase the effectiveness of the separation, specially designed distillation trays are used within the columns. These distillation trays are generally designed with a tray spacing ranging from 4 to 8 inches. For large plants, sieve trays are usually used. The hole area is typically 5 to 15% of the tray area. In an effort to maximize performance for a given pressure drop, tray designs which allow multiple weirs on each tray are common. The reduction in liquid inventory due to the presence of multiple weirs, results in a loss of point efficiency. An optimized design will typically yield a pressure drop per theoretical stage of separation of from 1.5 to 3.0 inches of liquid per theoretical stage of separation.

A reduction in the pressure drop per theoretical stage in the low pressure column reduces the pressure in the high pressure column for an equal temperature approach in the reboiler-condenser. A reduction in the high pressure column pressure in turn reduces the power consumption of the feed air compressor.

A distillation device which would allow separation with a pressure drop per theoretical stage substantially below that attainable with distillation trays would have substantial value for the cryogenic separation of air.

In the cryogenic industry, one method suggested to reduce the pressure drop per theoretical stage is to increase the open area fraction on the distillation tray. However, if the open area fraction is increased beyond about 0.20, and the superficial velocity is kept sufficiently low to prevent tray flooding at reasonable tray spacings, substantial weeping will occur. This results in a significant degradation of column performance.

The solution of the present invention is the use of structured or ordered packings. By the term structured or ordered packing is meant a packing in which liquid flows over shaped surfaces in a countercurrent direction to the gas flow and wherein the surface is arranged to give high mass transfer for low pressure drop with the promotion of liquid and/or vapor mixing in a direction perpendicular to the primary flow direction. Examples of ordered or structured packings are disclosed in U.S. Pat. Nos. 4,128,684; 4,186,159; 4,296,050; 4,455,339; 4,497,751; 4,497,752 and 4,497,753, the specifications of which are incorporated herein by reference. These patents disclose specific examples of structured (ordered) packings, however, they do not present an exhaustive list of examples. It should be noted that it is not the intention of the present invention to prefer one type of structured packing over another. All types of structured packings are believed to be applicable to the present invention. It should be pointed out that the performance of these packing elements are reasonably well known for hydrocarbon separations, however, no suggestions of this use appear in the art for the cryogenic separation of air.

Figure 5:
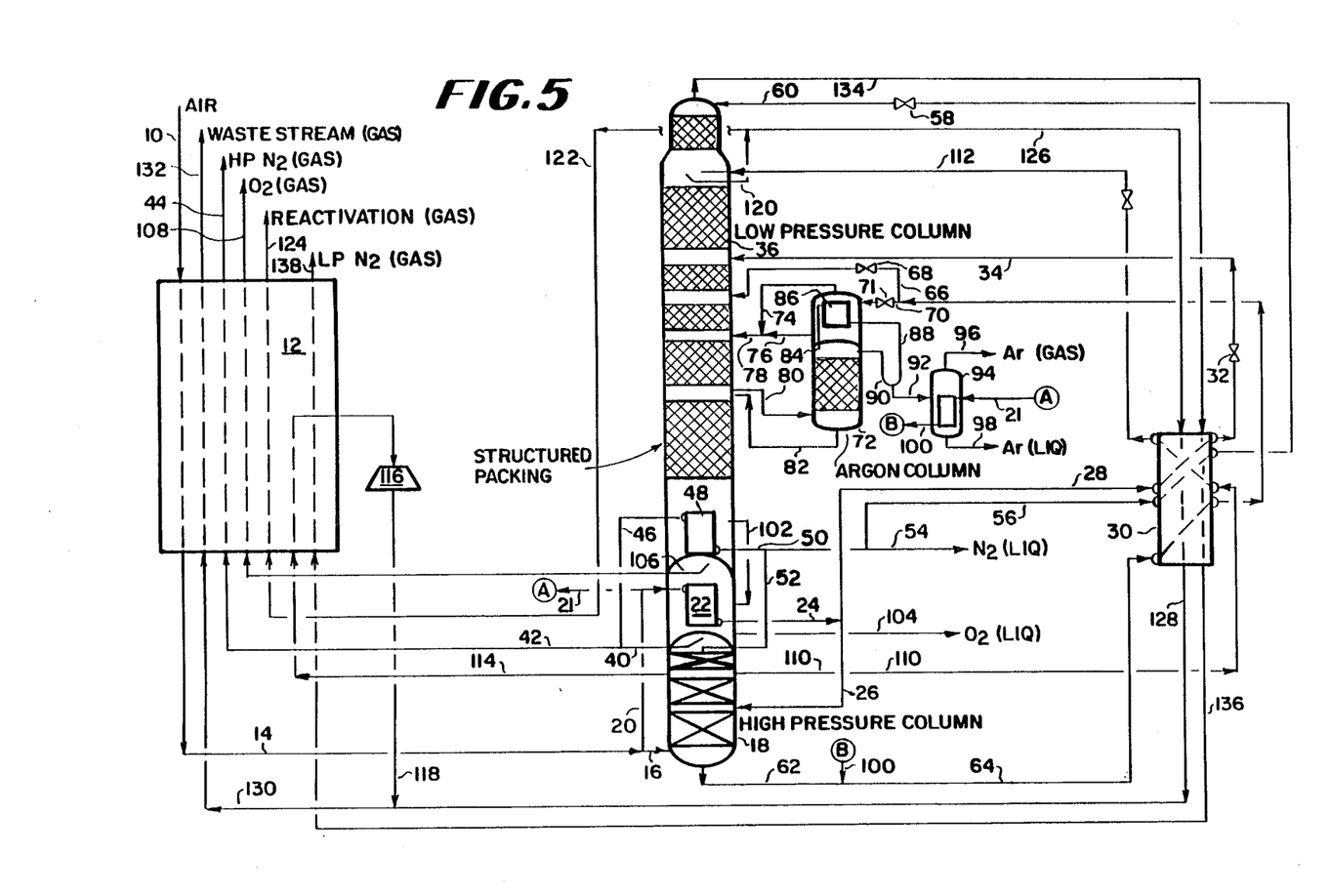
Figure 6:
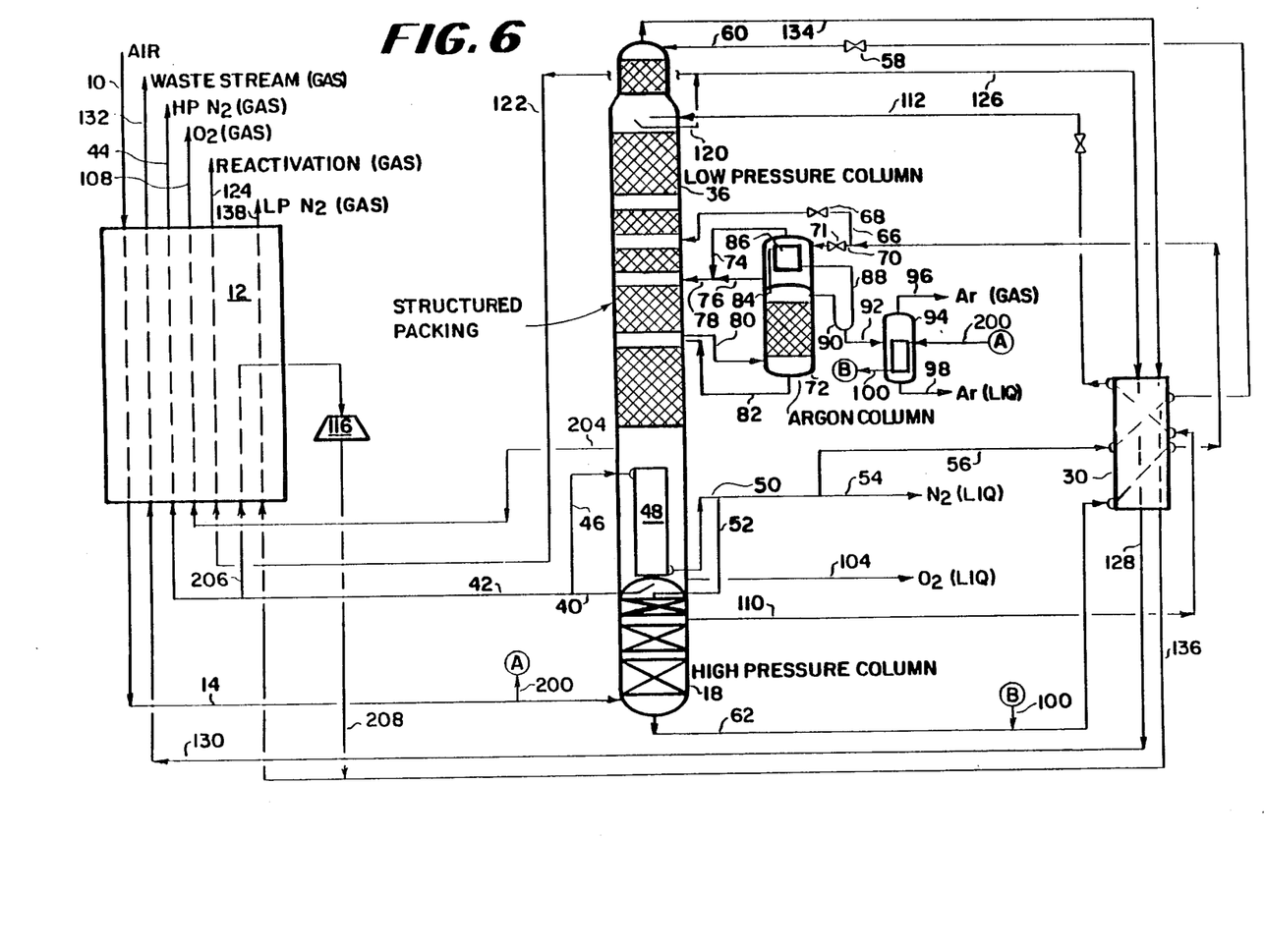

As stated earlier, the present invention essentially consists of replacement of the trays previously used as distillation stages in all sections of the low pressure and argon columns by structured packing, however, the trays in the high pressure column can also be replaced by structured packing to effect further energy savings. Examples of the present invention are shown in FIGS. 5 and 6. FIGS. 5 and 6 which are essentially the processes of FIG. 1 and 2, respectively, with the incorporation of structured packing in the argon sidearm and low pressure columns. The line and apparatus numbers shown in FIG. 5 and 6 are identical to their respective counterparts. The unexpected benefit of replacement of the trays by structured packing is described below.

A first benefit derived from the use of structured packing is the reduction of pressure drop below the minimum value per theoretical stage which can be achieved with distillation trays. Distillation trays are limited by the necessity to maintain a stable two phase fluid structure of gas bubbling through liquid. Thus, it is necessary to maintain a sufficient pressure drop of liquid across the bubbling device (distillation tray) to prevent the backflow of liquid. This backflow would lead to weeping and dumping from an upper tray to a lower tray. The minimum pressure drop to achieve this stability is about 1.5 inches of liquid per theoretical stage. In structured packing, the mass transfer occurs between blowing films of liquid and gas and is not subject to the bubbling stability limitation. Thus, pressure drops as low as 0.2 to 0.5 inches of liquid per theoretical stage can be achieved using structured packing.

Consequently, a lower feed air pressure can be achieved in a cryogenic distillation process for the production of oxygen and argon (and also nitrogen). This reduced pressure results in a lower compressor energy consumption for the process. A small part of the air compression energy saving is offset by a lower pressure for the oxygen produced in the process which must subsequently be compressed from this lower pressure to its use pressure. Argon produced in the process is not affected by a lower production pressure, since it is condensed to liquid and the liquid static head is used for subsequent transfer to storage.

A second important consequence of the reduced pressure in the distillation system is the increased volatility of argon and nitrogen relative to oxygen. This improves the separation of argon in the distillation process and changes the composition distribution between the columns in the system. This improved separation results in an unexpected synergistic benefit; a significantly larger recovery of argon than can be obtained under any comparable conditions using distillation trays in the column system. The product recovery from a complex distillation system is determined by the effects of number of distillation stages, pressure and component distribution through the system.

To demonstrate the above benefit, the following examples were calculated for the process of FIG. 6.

The process of FIG. 6 has been selected as the preferred basis for illustration since it is optimized for the maximum recovery of argon, whereas the process of FIG. 5 is appropriate for the optimum economic production of oxygen. In the process of FIG. 6 it is assumed that a nitrogen stream is removed from the high pressure column with a flow equal to 10% of the feed air, thus, giving comparable conditions to the distillation system for the comparitive calculations. Changes in the number of distillation stages have been effected proportionally throughout the column system. Small variations in the external cold box resulting from changes in pressure are compensated where necessary by the addition or subtraction of refrigeration from external sources.

To provide a basis of comparison, the behavior for a three column separation process using trays has been calculated and is presented as oxygen recovery change in Table I, below:

TABLE I

| Oxygen Recovery from a Three Column Process Producing 99.7% Oxygen | | | | |
|---|---|---|---|---|
| Number of Theoretical Stages in Columns: % of Design | 100 | 120 | 150 | 200 |
| Percentage of Oxygen Recovered as Product from Inlet Air Flow: | 20.83 | 20.90 | 20.91 | 20.92 |

As would normally be expected the increase is continuous. The small magnitude of the change is due to the very high efficiency of the process for oxygen production.

The effect of an increase in the number of distillation trays for the recovery of argon has been calculated and is shown in Table II, below. The basis of the calculation is the process of FIG. 2.

TABLE II

| Impure Argon Recovery from a Double Column Process with an Argon Sidearm Column (Three Column System) | | | | |
|---|---|---|---|---|
| Number of Theoretical Stages in Columns: % of Design | 100 | 120 | 150 | 200 |
| Percentage of Ar Recovered as Product for Ar Contained in Inlet Air Flow: | 74.8 | 83.2 | 85.9 | 80.5 |

As can be seen the effect of an increase in the number of distillation trays for argon recovery is significantly different from that for oxygen recovery. Argon recovery is found to increase initially and then pass through a maximum value.

When structured packing is used to partially or totally replace the trays in the distillation system, a surprisingly different results is obtained. It has been found that the argon recovery increases continuously with the number of distillation stages and is substantially higher than the maximum which can be achieved with distillation trays. This result is of particular importance due to the high economic value of argon.

Figure 3:
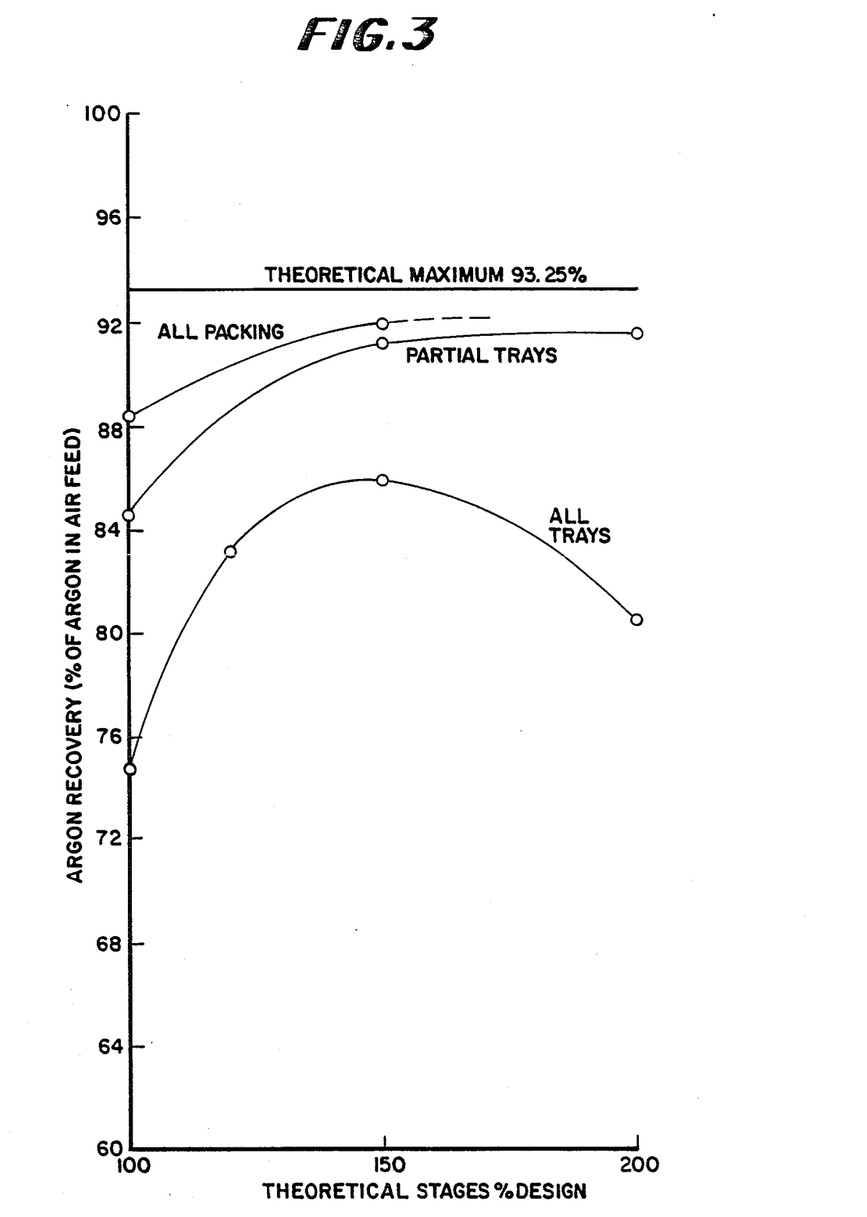
FIG. 3 is a plot of argon recovery as a percentage of argon in the air feed versus the relative number of theoretical stages.

These results for total and partial replacement of distillation trays with structured packing are shown in Table III and are illustrated for comparison with Table II in FIG. 3. The partial replacement of trays by packing corresponds to the composition range shown in U.S. Pat. No. 4,783,270. That compositional range is where argon concentration is within the range from about 0.6 to about 75 volume percent. Table III is below:

TABLE III

| Impure Argon Recovery from a Double Column Process with an Argon Sidearm Column (Three Column System) | | | |
|---|---|---|---|
| Number of Theoretical Stages in Columns: % of Design | 100 | 150 | 200 |
| Partial Replacement of Trays- Percentage of Ar Recovered as Product from Ar Contained in Inlet Air Flow: | 84.5 | 91.2 | 91.5 |
| Total Replacement of Trays- Percentage of Ar Recovered as Product from Ar Contained in Inlet Air Flow: | 88.4 | 91.9 | — |

Figure 4:
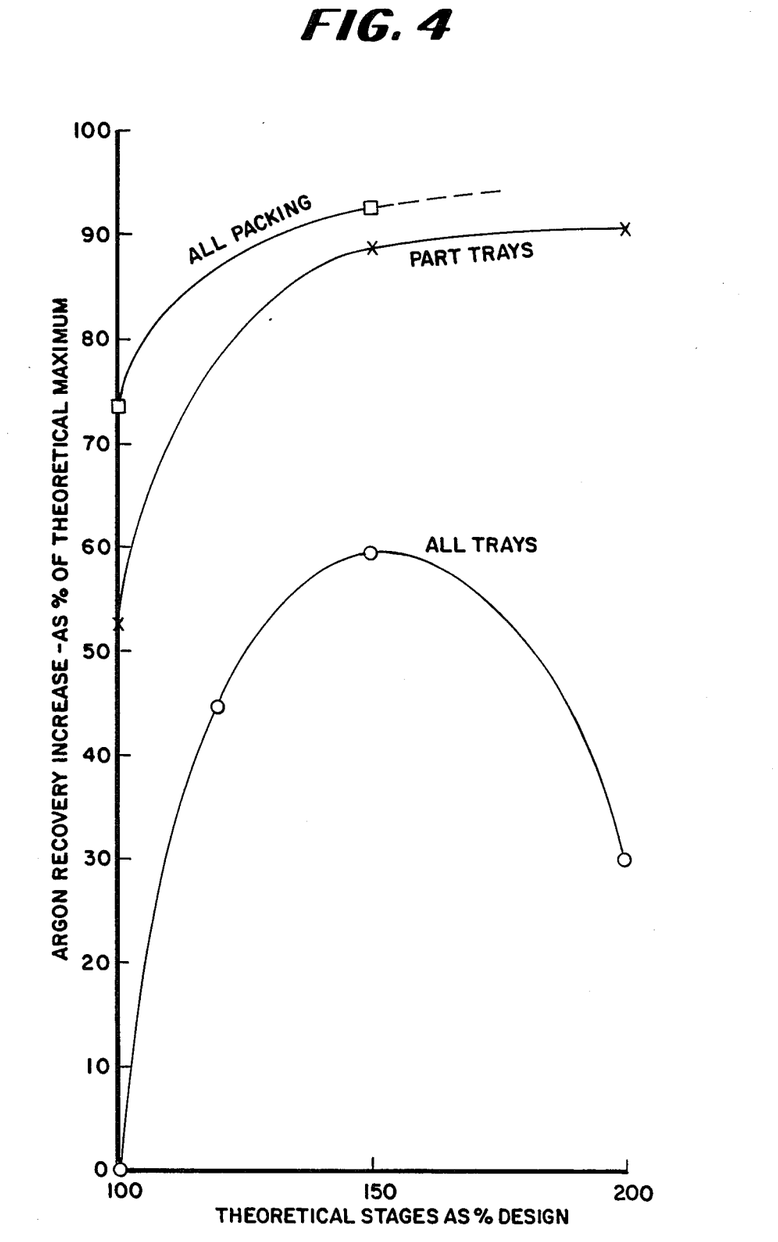
FIG. 4 is a plot of argon recovery increase as a percentage of theoretical maximum versus the relative number of the theoretical stages.

As can be seen from FIG. 3 and an analysis of Tables II and III, for the partial replacement of trays, an increase in the total number of stages to only 105% of design would effectuate a greater argon recovery than is maximally possible with all distillation trays. In addition, the use of packing throughout the low pressure and argon sidearm columns is always better than the best tray system. The magnitude of these benefits can be further illustrated by comparing the increase in argon recovery for the maximum theoretical increase available from the argon in the air feed. This percentage increase is shown in Table IV and FIG. 4.

TABLE IV

| Argon Recoveries Compared on the Basis of the Increase above the Tray Design Case as a Percentage of Maximum Theoretical Increase | | | | |
|---|---|---|---|---|
| Number of Theoretical Stages in Columns: % of Design | 100 | 120 | 150 | 200 |
| Percent Increase of Argon Recovery Relative to Theoretical Maximum | | | | |
| All Trays | 0 | 44.8 | 60.2 | 30.0 |
| Some Packing | 52.2 | N/C | 88.4 | 90.4 |
| All Packing | 73.5 | N/C | 92.5 | N/C |
| N/C — not calculated | | | | |

The remarkable and unexpected result evident from Table IV and FIG. 3 is that by the use of packing, it is possible to achieve increases in argon recovery to more than 90% of the theoretical maximum; whereas only 60% of the theoretical maximum can be achieved for any number of tray distillation stages.

The small amount of argon present in air creates a very high value for the argon produced from cryogenic oxygen plants. Other sources of argon such as ammonia purge gas require a much greater energy input and capital cost to effect the separation. Thus, the production of additional argon from an air separation plant constitutes a very large economic benefit to the operation of the process. Argon is therefore valued at a substantial premium over the corresponding oxygen production from the process.

A major component of the production cost in the separation of air is the energy requirement for the air feed and product compression. A convenient means of assessing the relative economic benefit of different processes is to evaluate the relative specific power for the products. Because of the premium value for argon, it is convenient to weight the argon specific power requirement in relation to oxygen. This may be done by applying a weighting multiplier for argon relative to oxygen. An example of such a weighting multiplier is to value argon production at five (5) times that for oxygen. This allows unit product specific powers to be calculated for the production from differing processes, and thus, compares the energy effectiveness of the process.

In order to show the benefit of the present invention, this calculation has been carried out for the process of FIG. 5 to compare relative energy consumptions for trays, partial packing and all packing. It is assumed for these calculations that an energy comparison may be made for the distillation process along by determining the isothermal energy of compression for air entering the distillation system and making a corresponding credit for the oxygen over-pressure leaving the system. A reference pressure of 14.5 psia has been assumed. Thus, the specific energy per unit of product oxygen and argon, $\epsilon$, has been calculated as:

$$\epsilon = \frac{RT_o}{(r_{O2} + Zr_{Ar})} \left[ \ln \frac{P_{air}}{P_{ref}} - r_{O2} \ln \frac{P_{O2}}{P_{ref}} \right]$$

where:
Z is a weighting factor for the value of argon near oxygen, assumed to be 5
$T_o$ is the ambient reference temperature for determining compression power
R is the universal gas constant
$P_{ref}$ is the reference pressure for gas compression, assumed to be 14.5 psia
$P_{air}$ and $P_{O2}$ are respectively the pressures of the air and oxygen at the column envelope
$r_{O2}$ and $r_{Ar}$ are respectively the recoveries of oxygen and argon expressed as a molar fraction of the air feed flow The value of $\epsilon$ has been calculated in relation to the design case for a distillation system with all trays at a pressure drop of 0.0766 psi/theoretical tray in the low pressure column and 0.095 psi/theoretical tray in the argon sidearm column. The corresponding pressure drops for packing were 0.0175 and 0.0148 psi/theoretical stage, respectively. The calculated results for percentage change of $\epsilon$ as a function of the number of distillation stages is shown in Table V, below:

TABLE V

Specific Energy per Molar Oxygen/Argon Product Unit as a Function of Number of Distillation Stages

| Number of Theoretical Stages in Columns: % of Design | 100 | 120 | 150 | 200 |
|---|---|---|---|---|
| Specific Energy, $\epsilon/RT_o$: | | | | |
| All Trays | 7.115 | 7.121 | 7.266 | 7.609 |
| Some Packing | 6.627 | N/C | 6.669 | 6.791 |
| All Packing | 6.395 | N/C | 6.395 | N/C |
| with enhanced mass transfer | 6.387 | 6.377 @ 116% | | |
| Specific Energy Saving as Percentage of 100% Design Case: | | | | |
| All Trays | 0 | −.08 | −2.1 | −6.9 |
| Some Packing | 6.9 | N/C | 6.3 | 4.6 |
| All Packing | 10.1 | N/C | 10.1 | N/C |
| with enhanced mass transfer | 10.2 | 10.4 @ 116% | | |

N/C — not calculated

Table V shows another surprising result. It is customarily expected that as the number of stages in a distillation process is increased, there will be an energy penalty associated with the increased pressure drop. This is shown to be true for the distillation tray system with a relative energy penalty of about 7% as the number of trays is doubled. Similarly, the energy benefit associated with the partial replacement of the trays by packing in the argon compositional range from about 0.6 to about 75 volume percent is reduced with increasing number of stages. However, for the case will all packing, a very large and constant energy benefit of more than 10% is observed for up to a 50% increase in the number of stages. This means that an argon recovery improvement of about 90% of the theoretical maximum can be achieved while still benefiting from the maximum energy savings.

In all of the foregoing, it has been assumed that a packed column would operate with a pressure drop behavior as calculated from current theoretical correlations. However, it is shown in U.S. Pat. No. 4,783,210 that packing used in oxygen/argon recovery service has a better than expected mass transfer performance, about 20% with respect to height. This benefit may be added to the previous calculations by either determining the energy savings at the design number of stages from reduced pressure drop due to reduced height or by calculating the specific energy and production benefit for the same height of packing (same pressure drop as the design number of theoretical stages without enhanced mass transfer).

These calculated values are also shown in Table V. This result shows that the maximum benefit is obtained by using an extra number of stages resulting from the improved performance to give a specific savings of 10.4%.

The present invention has been described with reference to a specific embodiment thereof. This embodiment should not be seen as a limitation of the scope of this invention. The scope of the present invention should be ascertained by the following claims.

We claim:
1. In a process for the separation of mixtures, which comprise oxygen, nitrogen, and argon, by cryogenic distillation in an integrated multi-column distillation system of at least three distillation columns, having a higher pressure column, low pressure column and an argon sidearm column wherein the argon sidearm column integrally communicates with the low pressure column, and wherein each column of the integrated distillation system, a liquid phase stream and a vapor phase stream are intimately contacted thereby allowing mass transfer; the improvement for increasing argon recovery comprises effectuating the intimate contact of the liquid and vapor phase streams in the low pressure column and the argon sidearm column by utilizing a structured packing.

2. The process of claim 1, wherein gaseous oxygen is produced directly from the low pressure column.

3. The process of claim 1, wherein liquid oxygen is produced and removed from the low pressure column and vaporized against a condensing feed air stream.

* * * * *